R. R. ROBERTS.
MACHINE FOR TREATING FIBROUS PLANTS.
APPLICATION FILED MAY 24, 1913.
1,132,122.
Patented Mar. 16, 1915.
4 SHEETS—SHEET 1.
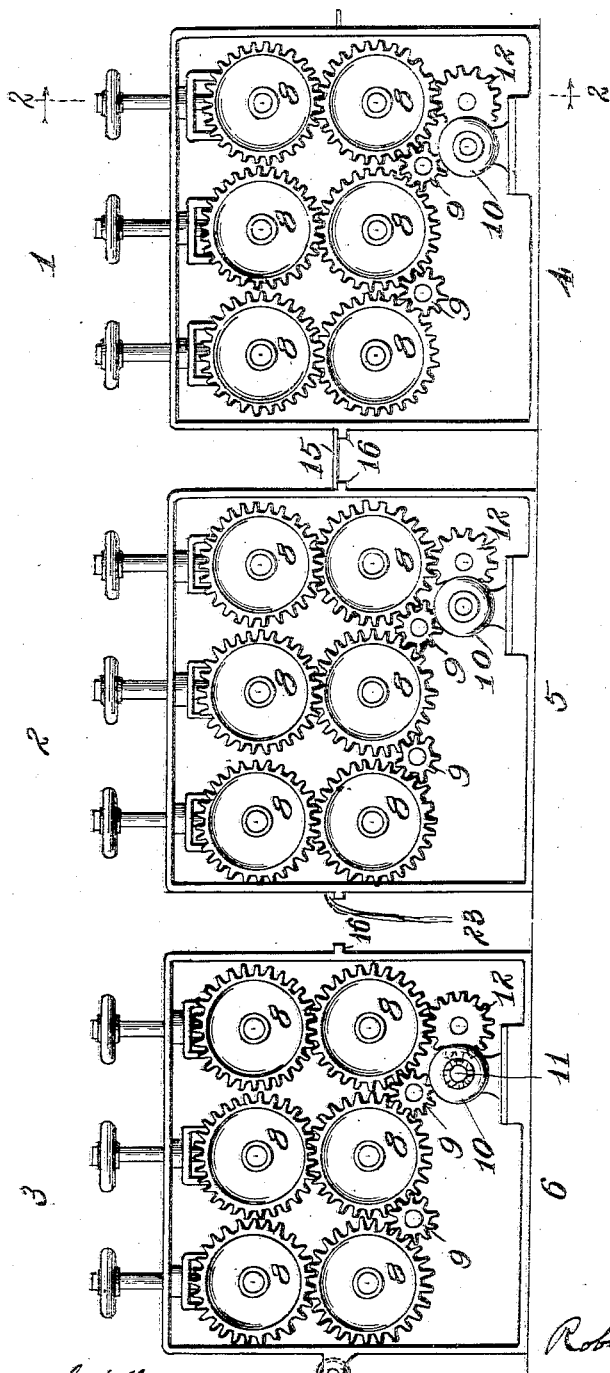

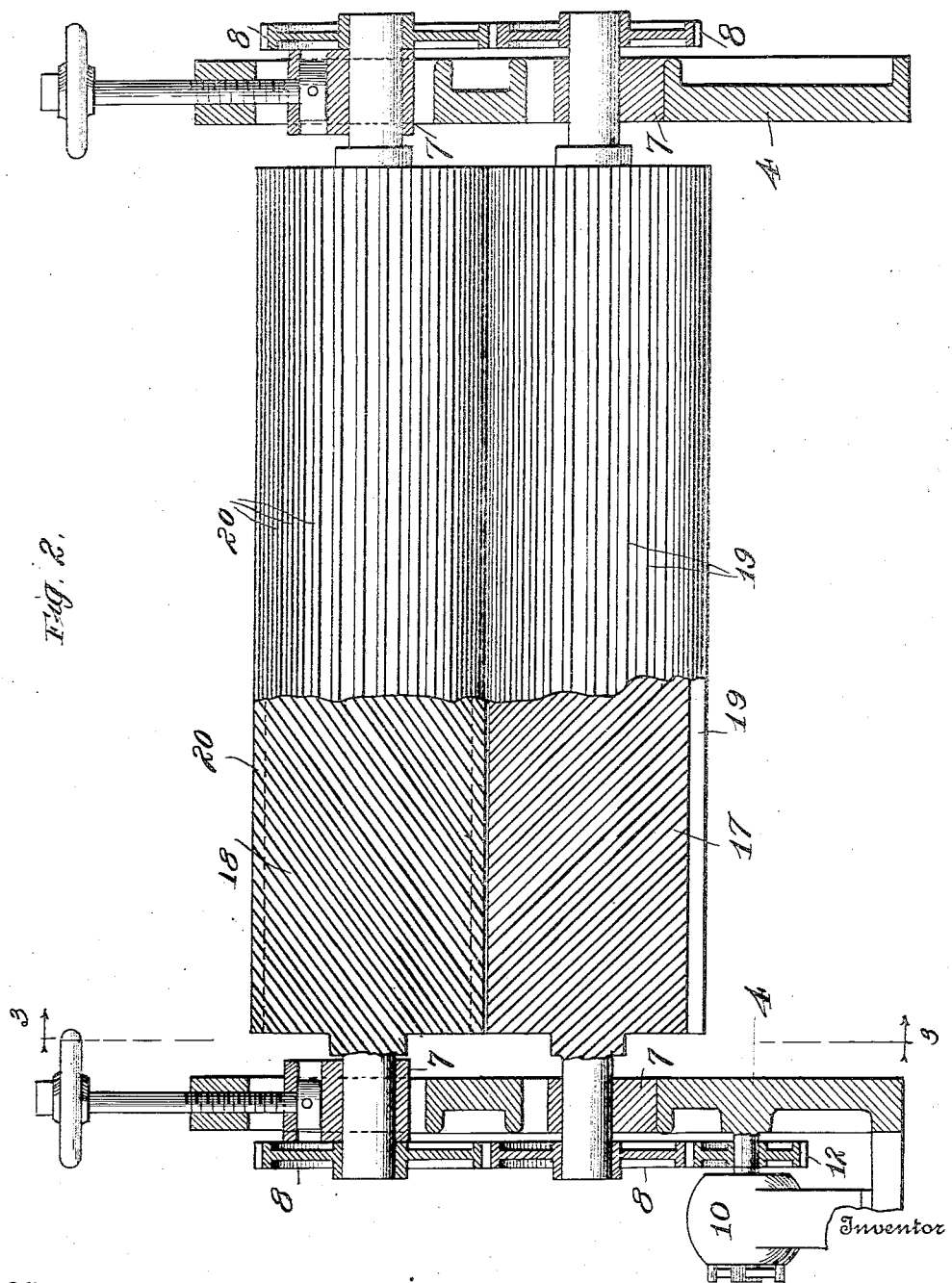

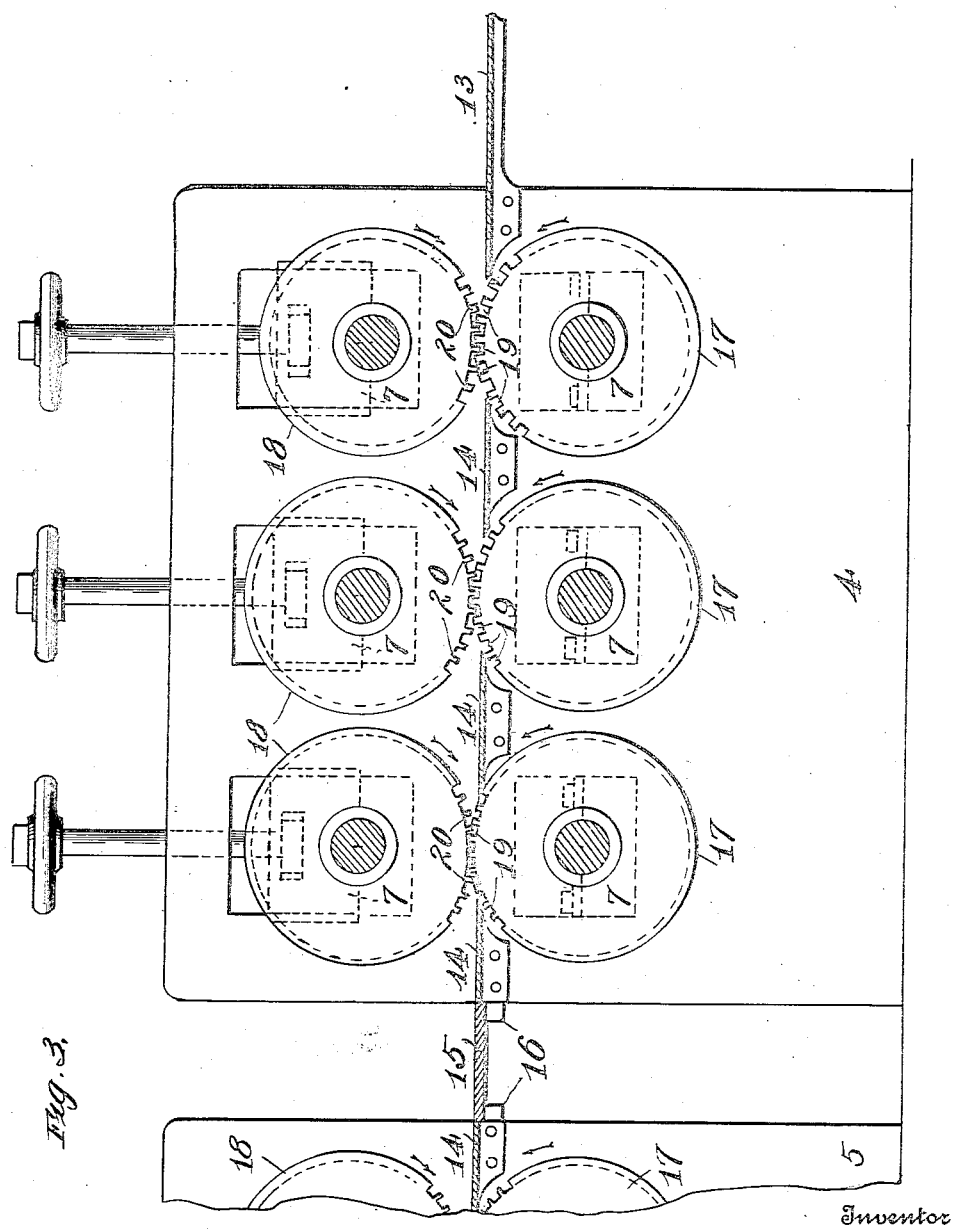

R. R. ROBERTS.
MACHINE FOR TREATING FIBROUS PLANTS.
APPLICATION FILED MAY 24, 1913.
1,132,122.
Patented Mar. 16, 1915.
4 SHEETS—SHEET 4.
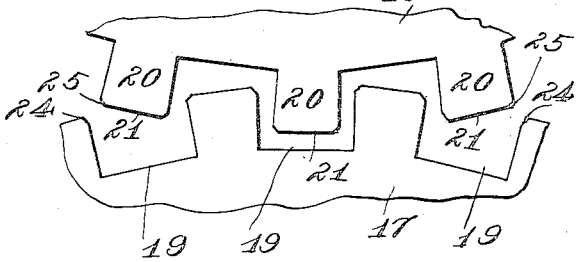
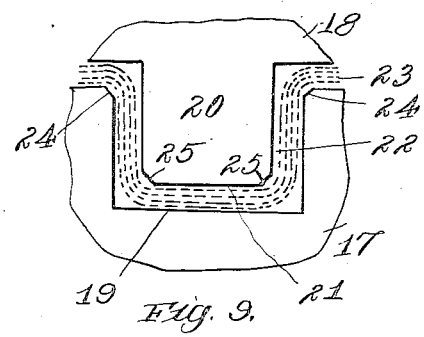
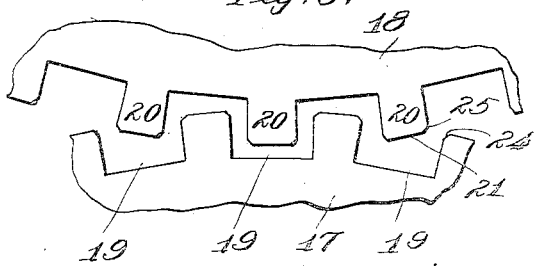
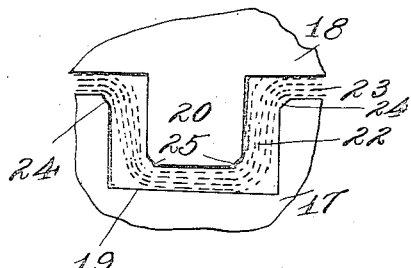
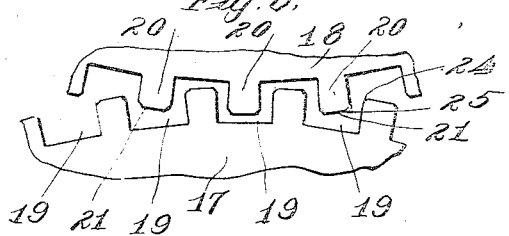
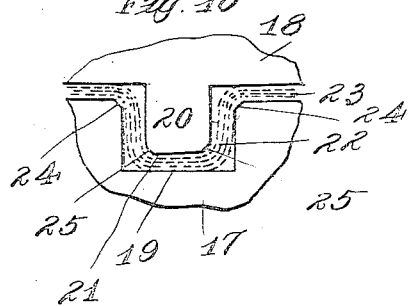
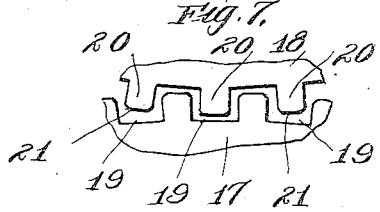
Witnesses
Inventor
Robert R. Roberts
By D. C. Reinohl & Son.
Attorneys.

UNITED STATES PATENT OFFICE.

ROBERT R. ROBERTS, OF WASHINGTON, DISTRICT OF COLUMBIA, ASSIGNOR TO THE INTERCONTINENTAL FIBER & PAPER COMPANY, OF WASHINGTON, DISTRICT OF COLUMBIA.

MACHINE FOR TREATING FIBROUS PLANTS.

1,132,122.  Specification of Letters Patent.  Patented Mar. 16, 1915.

Application filed May 24, 1913. Serial No. 769,617.

*To all whom it may concern:*

Be it known that I, ROBERT R. ROBERTS, a citizen of the United States, residing at Washington, in the District of Columbia, have invented certain new and useful Improvements in Machines for Treating Fibrous Plants; and I do hereby declare the following to be a full, clear, and exact description of the invention, such as will enable others skilled in the art to which it appertains to make and use the same.

My present invention relates to machines for treating fibrous plants, such as flax, hemp, ramie, jute, milkweed and the like whose fibers are susceptible of being used in commerce, has for its object the de-shiving and decorticating of such plants preparatory to chemical treatment of the fiber.

The invention consists in certain improvements which will be fully disclosed in the following specification and claims.

In the accompanying drawings, which form part of this specification:—Figure 1 is a side elevation of a machine embodying my invention. Fig. 2 is a vertical transverse section, partly in elevation, on line 2—2, Fig. 1, on an enlarged scale. Fig. 3 is a like view on line 3—3 Fig. 2. Figs. 4, 5 and 6 are enlarged detail views of one pair of rolls in each bank of rolls, and Fig. 7 is a like detail view of the first roll of the second bank of rolls. Figs. 8, 9 and 10 respectively are exaggerated views of Figs. 4, 5 and 6.

Reference being had to the drawings and the designating characters thereon, the numeral 1 indicates the first bank of rolls in a series, 2 the second bank and 3 the third bank of rolls. Each bank comprises three pairs of rolls, upper and lower, suitably mounted on frames 4, 5 and 6 in conventional journal bearings 7.

On each end of the rolls are intermeshing master gear-wheels 8, driven by pinions 9, are propelled by any suitable motor, such as 10 connected to the series of gear wheels by pinions 11 and 12, or the rolls may be driven by any approved driving mechanism from any preferred source of power.

For the purpose of illustration, each bank of rolls is shown provided with its own electric motor 10, so that each bank can be operated separately, but it is obvious that all the rolls in the three banks of rolls may be operated synchronously from one source of power.

13 indicates a feed apron at the receiving end of the first bank of rolls, and between each pair of rolls throughout the three banks are aprons 14, and between each adjacent bank of rolls is an apron 15, supported on lugs 16 on the frames, either or both of which aprons 15 may be removed and the decorticated fiber allowed to be dropped, provided it has been thoroughly decorticated in its passage through one or two of the banks of rolls.

17 indicates the lower roll and 18 the upper roll of each pair of rolls in the several banks of rolls; the lower roll 17 of each pair is provided with peripheral longitudinal and approximately equilateral grooves 19 throughout its circumference, in which the side walls of the grooves are approximately at right angles to the flat bottom of the grooves as shown in Figs. 3, 4, 5, 6, 7, 8, 9 and 10, and the top roll 18 of each pair of rolls is provided with peripheral longitudinal and approximately equilateral bars 20 throughout its circumference, in which the sides of the bars are in parallel planes and approximately at right angles to the faces 21 of said bars, and said bars are of less width and depth than the grooves 19 to afford a substantial clearance space 22 on the sides and bottom of the grooves to allow the fiber 23 to pass through and be deshived or decorticated without breaking the fiber, as shown in Figs. 8, 9 and 10, and to facilitate the breaking of the woody covering of the stalks, the upper ends 24 of the walls of the grooves 19 and the outer ends 25 of the sides of the bars 20 are preferably cut at an angle to the wall of the grooves and the sides of the bars to form flat breaking surfaces as shown.

The grooves and the bars are graduated, that is to say the grooves in the lower rolls of bank 4 are preferably about three eighths (3/8) of an inch wide and about one fourth (1/4) of an inch deep, and the bars on the upper roll are preferably about one fourth (1/4) of an inch wide, and about one eighth (1/8) of an inch thick.

The grooves in the lower rolls of bank 5 are preferably about five sixteenths (5/16) of an inch wide and about three sixteenths (3/16) of an inch deep or thick, and the bars on the upper rolls are preferably about three sixteenths (3/16) of an inch wide and about one eighth (1/8) of an inch deep or thick. The grooves in the lower rolls of bank 6 are preferably about seven thirty-seconds (7/32) of an inch wide and about one eighth (1/8) of an inch deep or thick, and the bars on the upper rolls are preferably about one eighth (1/8) of an inch wide and about one eighth (1/8) of an inch thick. This graduation of the grooves and the bars operates to produce a thorough and effectual breaking up of the woody covering of the stalks in its passage through the gang of rolls, and furthermore operates to draw the stalks and the fiber through the rolls.

The dimensions of the grooves and the bars given apply particularly to the treatment of flax, but by proportionately increasing the dimensions given, stalks of jute, Indian hemp or ramie may be treated, deshived or decorticated with equal facility.

Proper endless belts to feed the flax or other plants or stalks and to deliver the treated article may be used as found advantageous.

Fiber thus treated is free from breaks and fractures, as generally occurs in its treatment and the full length of the fiber is preserved.

Having thus fully described my invention, what I claim is:

1. In a machine of the class described, a pair of rolls, one of which is provided with peripheral longitudinal approximately rectangular or equilateral grooves, and the opposite roll provided with peripheral longitudinal approximately rectangular or equilateral bars of less width and depth than the aforesaid grooves.

2. In a machine of the class described, a pair of rolls, one of which is provided with peripheral longitudinal rectangular or equilateral grooves having angular breaking surfaces at the outer ends of their side walls, and the opposite roll provided with peripheral longitudinal approximately rectangular or equilateral bars of less width and depth than the aforesaid grooves and having breaking surfaces on the outer edges of the bars.

3. In a machine of the class described, a plurality of pairs of rolls, one roll of each pair provided with peripheral longitudinal approximately rectangular or equilateral grooves, and the opposite roll of each pair provided with peripheral longitudinal approximately rectangular or equilateral bars of less width and depth than the aforesaid grooves, and means for conducting material from one bank of rolls to the next adjacent bank.

4. In a machine of the class described, two or more banks of rolls, each bank comprising a plurality of pairs of rolls, one roll in each pair having peripheral longitudinal approximately rectangular or equilateral grooves, and the opposite roll in each pair having peripheral longitudinal approximately rectangular or equilateral bars of less width and depth than the aforesaid grooves, and means for propelling each bank of rolls separately.

5. In a machine of the class described, two or more banks of rolls, each bank comprising a plurality of pairs of rolls, one roll of each pair having peripheral longitudinal approximately rectangular or equilateral grooves, and the opposite roll of each pair having peripheral longitudinal approximately rectangular or equilateral bars of less width and depth than the aforesaid grooves, said grooves and said bars being graduated from the first bank of rolls to the last bank of rolls.

6. In a machine of the class described, a plurality of pairs of rolls, one of which rolls of each pair is provided with peripheral longitudinal grooves having parallel walls approximately at a right angle to the bottom of the grooves, and the opposite roll provided with bars of less width and depth than the aforesaid grooves and affording a substantial clearance on both sides and the end of said bars for the purpose described and an apron between each pair of rolls.

7. In a machine of the class described, a plurality of pairs of rolls, one roll of each pair being provided with peripheral grooves having breaking surfaces at the outer ends of their side walls, and the opposite roll provided with peripheral bars having breaking surfaces on the edges of the bars, and of less width and depth than the aforesaid grooves to form an unobstructed space on the sides and end of said bars.

In testimony whereof I affix my signature, in presence of two witnesses.

ROBERT R. ROBERTS.

Witnesses:
D. C. REINOHL,
W. PARKER REINOHL.